United States Patent [19]
Koh et al.

[11] Patent Number: 5,562,942
[45] Date of Patent: * Oct. 8, 1996

[54] SALT COMPOSITIONS

[76] Inventors: Hen-Sik Koh, 1-12-1 Zeze, Ohtsu, Japan, 520; Yoshikazu Kawashima, 99 Fushio, Ikeda, Japan, 563; Takayuki Hasimoto, 2587 Komuro, Funabashi, Japan, 271

[*] Notice: The term of this patent shall not extend beyond the expiration date of Pat. No. 5,562,943.

[21] Appl. No.: 288,951

[22] Filed: Aug. 11, 1994

[30]　　　Foreign Application Priority Data

Oct. 5, 1993　　[JP]　　Japan ..................................... 5-249152

[51] Int. Cl.$^6$ ................................................... A23L 1/237
[52] U.S. Cl. ............................................ 426/649; 426/650
[58] Field of Search ..................................... 426/649, 650

[56]　　　　　References Cited

U.S. PATENT DOCUMENTS

| | | | |
|---|---|---|---|
| 2,601,112 | 6/1952 | Freedman | 426/649 |
| 2,968,566 | 1/1961 | Munch | 426/649 |
| 3,514,296 | 5/1970 | Frank et al. | 426/649 |
| 4,066,793 | 1/1978 | Eguchi | 426/650 |
| 4,068,006 | 1/1978 | Moritz | 426/649 |
| 4,107,346 | 8/1978 | Kravitz | 426/648 |
| 4,243,691 | 1/1981 | Mohlenkamp et al. | 426/649 |
| 4,399,164 | 8/1983 | Lauck et al. | 426/583 |
| 4,963,387 | 10/1990 | Nakgawa et al. | 426/649 |

*Primary Examiner*—Arthur L. Corbin
*Attorney, Agent, or Firm*—Burgess, Ryan and Wayne

[57]　　　　　ABSTRACT

A salt composition is provided for the purpose of preventing excess intake of salt (sodium chloride) and achieving well balanced intake of minerals. The composition which is used in place of conventional table salt consists essentially of 100 parts by weight of a mixture containing 30 to 75% by weight of table salt and 25 to 70% by weight of potassium chloride being admixed with 5 to 60 parts by weight of a citric acid salt, e.g. tripotassium citrate. Seasonings, such as soybean paste and soy sauce, and foods, such as pickles and kimchi, can be prepared with such salt composition.

9 Claims, No Drawings

SALT COMPOSITIONS

BACKGROUND OF THE INVENTION

1. Field of the Invention

The present invention relates to novel salt compositions that can take the place of conventional salt or table salt. This invention is also concerned with functional salty-taste seasonings or condiments wherein the salt compositions are added to conventional seasonings.

2. Background Art

Salt or table salt as used hitherto includes, for example, purified salt produced by the ion exchange process as well as rock salt, natural salt manufactured by the solar evaporation process or salt pond process, and the like. The above-mentioned kinds of table salt all contain not less than 95 weight % of sodium chloride. It has long been pointed out that the Japanese foods, inclusive of soybean paste, soy sauce and pickles, are prepared with large quantities of salt.

Sodium chloride itself is in no way harmful or hazardous to the human body but rather supplies Na (sodium) and Cl (chlorine) that are requisite for maintenance of the physiological functions of the human body. As is well known, however, a serious problem of imbalance is often encountered in the intake between sodium and potassium in high-sodium but low-potassium diets, which imbalance has mainly been the cause of hypertension that is of grave concern in the diseases of adult people.

Consequently, it is strongly recommended to have a restricted intake of salt. But the poorly salt-seasoned dishes prepared with a reduced amount of salt do not taste good, thus diminishing one's appetite. For the purpose of reducing the salt intake, while maintaining a proper degree of salty taste, it has been proposed to use potassium chloride as a partial replacement for table salt. Nevertheless, potassium chloride possesses a particular bitterness, and when added to foods, it severely spoils and impairs their tastes. A variety of countermeasures are devised so as to eliminate the bitterness of potassium chloride: for example, the addition of calcium chloride or magnesium chloride was reported in the Japanese Patent Publication No. 15299/1985. Yet, all of them to date have turned out to be far from being satisfactory.

SUMMARY OF THE INVENTION

This invention has as an object to provide the salty-taste or salting compositions which, even when used in reduced quantities, can permit appropriate salty seasoning as is the case with the sole use of table salt and also provide improved flavor that excels those of the conventionally known replacement products for salt. Also an objective of this invention is to enable a better balanced intake of minerals and to contribute to both the improvement of a persons diet and the promotion of ones health.

The present inventors conducted extensive research and found that citrates, particularly tripotassium citrate, can be added to a salt composition as a means of supplementing potassium chloride for reducing the content of sodium chloride, while eliminating its bitterness, thereby achieving the desired objects.

Thus, the present invention relates to salt compositions which comprise 100 parts by weight of a mixture containing 30 to 75 weight % of salt and 25 to 70 weight % of potassium chloride being admixed with 5 to 60 parts by weight of a citrate.

DETAILED DESCRIPTION OF THE PREFERRED EMBODIMENTS

In the salt composition of the present invention, the term "salt (or table salt)" is understood to designate ordinary edible salt containing not less than 95 weight % of sodium chloride, such as purified salt manufactured by the ion exchange membrane method, rock salt, and natural salt produced by the solar evaporation process or the salt pond process, etc., with rock salt and natural salt being preferred from the standpoints of improved flavor and well balanced contents of minerals. Depending upon the type of salt used as a starting material, magnesium chloride, magnesium sulfate, calcium chloride, calcium sulfate, etc. may be added with a specific view to provision of well-balanced minerals and enhanced flavor. It is to be noted that from the standpoint of better flavor, they preferably are added in the proportion of less than 2 weight % of the total amount of the resulting composition.

In the salt composition of the present invention, the weight ratio of sodium chloride to potassium chloride should be maintained within the range of 75:25 to 30:70. In cases where potassium chloride is used in proporitons of not less than 70 weight %, the bitterness of the potassium chloride is difficult to eliminate and when the compound is utilized at ratios of less than 25 weight %, the resulting composition of necessity produces a diminished salt-reducing effect. Mixtures of salt with potassium chloride show particular bitterness, and according to the present invention, such bitterness can be eliminated by the addition of a citrate, among others, tripotassium citrate. In this case, less than 5 parts by weight of such citrate against 100 parts by weight of the mixture of salt with potassium chloride fails to eliminate the bitterness, while not less than 60 parts by weight results in reduction in salty taste, providing foods with flavor of a different nature from that of table salt. It is therefore not desirable to add a citrate at ratios of less than 5 or not less than 60 parts by weight against 100 parts by weight of the mixture of salt and potassium chloride.

The salt composition of the present invention contains a citrate in the above-described quantities.

Citric acid is a metabolite generated in the citric acid cycle (also referred to as TCA cycle) which is one of the metabolic cycles in the human body, and the intake of citric acid is said to contribute to maintain the acid-alkali balance, keep the body fluid and blood at the weakly alkaline pH value of 7.4 and improve the three major functions of the human body, or digestion, absorption and metabolism. As a citrate, there are employed trisodium citrate, tripotassium citrate, calcium citrate, magnesium citrate and the like. In the functional salt composition of the present invention, among these citrates, trisodium citrate and/or tripotassium citrate are used as an essential component, and calcium citrate and magnesium citrate are employable, if required from the standpoint of the better-balanced intake of minerals. In consideration of the preferred Na/K ratio and preferred flavor, it is considered desirable to use tripotassium citrate as a principal component, out of the above-mentioned citrates.

The salt composition of the present invention, with the citrate formulated therein, not only serves a useful purpose to preserve the health but also produces the striking effect of eliminating the bitterness of potassium chloride created by formulating a decreased amount of table salt.

The salt composition of the present invention can also be used as a salty-taste or salting ingredient in place of conventionally used salt, in the manufacture of seasonings such as soybean paste and soy sauce; the salt composition can be added in proportions of 10 to 25 parts by weight against 100 parts by weight of a starting material to produce novel salting seasonings being well balanced in minerals. Such salting seasonings are also included in the scope of this invention.

Furthermore, the salt composition of the present invention is employable in the preparation of such foods as pickles and kimchi as a replacement for conventionally used table salt, and the resultant novel food products containing well-balanced minerals are also included within the scope of this invention.

The salt composition of this invention can additionally be admixed with ordinary natural seasonings (for example, natural bases for soup stock, dried bonito, dried small sardines, tangle, mushrooms, meat extracts, etc.) and other seasonings such as amino-acid based ones (for example, monosodium glutamate, etc.), nucleic-acid based ones (for example, sodium 5'-guanylate, sodium 5'-inosinate, etc.) and citrate based ones (for example, citric acid, citrates, etc.) as well as flavor-intensifying agents and fortifying agents such as vitamins and minerals.

Numerous papers have been published so far on the animal experiments and human clinical trials, demonstrating that the diet with a Na/K ratio of less than 1 can prevent hypertension and contribute to curing the disease. Also, "Guidance on Diets for Promoting Health" published under the supervision of the Ministry of Health and Welfare of the Japanese Government sets forth the salt restriction as well as the balanced intake of essential minerals as an important item of guidance. The salt composition of the present invention can have its Na/K ratio adjusted to 1 or less than 1, while retaining the same degree of salty taste as conventional table salt, and can be said to be an ideal composition in terms of balances intake of minerals. The functional salt composition of this invention, when taken consecutively, and the seasonings (for example, soybean paste, soy sauce, etc.) and food products (for example, pickles, kimchi, etc.) as prepared with the functional salt composition of this invention, when eaten habitually, possibly results in the prevent and cure of hypertension.

The present invention is illustrated in more detail on the basis of the examples but this invention is not understood to be limited to such examples.

EXAMPLE 1

Naturally occurring salt (marketed under the tradename of "Akoh no Teshio", having the composition on an anhydride basis of 97.86% of NaCl, 0.10% of KCl, 1.68% of $MgCl_2$, 0.18% of $MgSO_4$ and 0.18% of $CaSO_4$) (50 g), KCl (25 g) and tripotassium citrate (25 g) were mixed to give a functional salt composition (100 g). The composition, with its Na/K ratio of 0.85, was rich in flavor and mild in salty taste.

The composition, as a salt seasoning material, was added to cucumbers at a ratio of 6 weight % to prepare freshly salted pickles.

The pickled cucumber was tasted for evaluation by 50 subjects, all of whom rate the pickle with having a better flavor than the counterpart prepared with conventional table salt.

EXAMPLES 2 THROUGH 6 AND
COMPARATIVE EXAMPLES 1 THROUGH 4

Natural salt as used in Example 1, potassium chloride and citrates were formulated and mixed in the quantities as shown in Table 1 to prepare different salt compositions, which were investigated for flavoring property and Na/K ratio.

| Ingredient | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
|---|---|---|---|---|---|---|---|---|---|
| Natural Salt | 75 | 60 | 50 | 60 | 30 | 90 | 20 | 60 | 60 |
| KCl | 25 | 40 | 50 | 40 | 70 | 10 | 80 | 40 | 40 |
| Trisodium citrate | — | — | 20 | — | 30 | — | 30 | — | — |
| Tripotassium citrate | 60 | 30 | — | 6 | — | 30 | — | — | 70 |
| Na/K ratio* | 0.80 | 0.71 | 0.94 | 0.99 | 0.53 | 2.07 | 0.37 | 1.10 | 0.48 |
| Flavoring | *1 | *2 | *3 | 3* | 4* | 2* | 5* | 5* | 6* |

Notes:
*: Calculated on an anhydride basis.
*1: Slight in salty taste but rich in flavor.
*2: Salty taste with rich flavor.
*3: Salty taste with slight bitterness.
*4: Bitter taste but edible.
*5: Strongly bitter taste, being not edible.
*6: Slight in salty taste, giving strange flavor.

As is obvious from Table 1, the citrates are required for eliminating the bitterness of potassium chloride (refer to Examples 3 and 4 and Comparative Example 3), but even when the citrate is added, if the potassium content is not less than 70 weight %, the resultant salt composition is far from being edible (refer to Example 6 and Comparative Example 2). The citrates can eliminate the bitterness of potassium chloride, with the potassium salt being preferable (refer to Examples 3, 4 and 5), but the citrates, when formulated at ratios of not less than 60 weight %, provide the salt compositions with reduced salty taste and flavor of a different nature (refer to Example 2 and Comparative Example 4). When table salt is formulated at ratios in excess of 75 weight %, this yields a well preserved salty taste but produces the salt compositions with Na/Ka ratio of not less than 1, which are entirely distinct from what is intended by the functional salt composition of this invention (refer to Comparative Examples 1).

EXAMPLE 7

30 parts by weight of a steam-cooked mixture of defatted soybean and soybean (7:3 in weight ratio) and 20 parts by weight of parched wheat were mixed, and the mixture was admixed with seed Koji malt to prepare soy sauce Koji malt. A portion (7 kg) of the soy sauce Koji malt was admixed with a solution of salt (3 kg) and the salt composition (3.6 kg) as described in Example 1 in water (12 liters), followed by maturation in accordance with the conventional procedure to prepare soy sauce. The soy sauce was analyzed, and its analytical results are shown in Table 2, along with those for the conventional soy sauce prepared with ordinary salt for comparative purpose.

TABLE 2

Analytical results of two kinds of soy sauce, in weight %.

| Item of analysis | Soy sauce prepared with table salt | Soy sauce prepared with the composition of Example 1 |
| --- | --- | --- |
| Total nitrogen | 1.84 | 1.87 |
| Extract | 21.00 | 21.40 |
| Alcohols | 1.00 | 1.05 |
| pH | 5.00 | 5.01 |
| Sodium | 5.77 | 3.52 |
| Potassium | 0.40 | 4.53 |
| Citric acid | 0.26 | 2.70 |

Two kinds of soy sauce were tasted for evaluation by 50 subjects, all of which rated the soy sauce prepared with the salt composition of the present invention as having a better flavor than the one prepared with salt.

The commercially available, low-salt soy sauce contains less than 3.55 weight % of sodium, with its potassium content as low as 0.4 weight %, and is known well to be much inferior in flavor to soy sauce prepared with ordinary salt. The soy sauce as prepared with use of the salt composition of this invention not only offers better flavor but also shows a content of sodium approximately equal to the one of the low-salt soy sauce, a Na/K ratio of less than 1 and a considerably high content of citric acid, thus being suited for the prevention and therapy of the diseases of adult people such as hypertension.

What is claimed is:

1. An edible salt composition consisting essentially of 100 parts by weight of a mixture consisting of 30 to 75 weight % of sodium chloride and 25 to 70 weight % of potassium chloride, and 5 to 60 parts by weight, based on 100 parts by weight of the mixture, of tripotassium citrate, and wherein the sodium/potassium ion ratio is less than 1.

2. The composition as claimed in claim 1, which additionally contains at least one flavor intensifying agent selected from the group consisting of natural seasonings, amino-acid based seasonings, nucleic-acid based seasonings and citrate based seasonings.

3. The composition as claimed in claim 2, which additionally contains at least one fortifying agent selected from the group consisting of vitamins and minerals.

4. A seasoning composition prepared with the salt composition of claim 1.

5. The seasoning composition as claimed in claim 4 which is soybean paste.

6. The seasoning composition as claimed in claim 4 which is soy sauce.

7. A food prepared with the salt composition of claim 1.

8. The food as claimed in claim 1 which is a pickle.

9. The food as claimed in claim 1 with is kimchi.

* * * * *